United States Patent [19]

Perry et al.

[11] Patent Number: 6,149,066

[45] Date of Patent: Nov. 21, 2000

[54] METHOD AND APPARATUS FOR CONTROLLING SUPPLEMENTAL HEAT IN A HEAT PUMP SYSTEM

[75] Inventors: Timothy J. Perry, Zionsville; Hongmei Liang, Indianapolis; Larry J. Burkhart, Indianapolis; Nathan D. Wright, Indianapolis; Raymond A. Rust, Jr., Gosport; Louis J. Sullivan, Indianapolis, all of Ind.

[73] Assignee: Carrier Corporation, Farmington, Conn.

[21] Appl. No.: 09/375,859

[22] Filed: Aug. 17, 1999

Related U.S. Application Data

[62] Division of application No. 09/012,542, Jan. 23, 1998.

[51] Int. Cl.[7] .................................................. G05D 23/00
[52] U.S. Cl. ............................................ 237/2 B; 237/2 A
[58] Field of Search ..................................... 237/2 B, 2 A; 165/240, 242, 241

[56] References Cited

U.S. PATENT DOCUMENTS

| | | | |
|---|---|---|---|
| 4,141,408 | 2/1979 | Garnett | 165/29 |
| 4,353,409 | 10/1982 | Saunders | 165/2 |
| 5,332,028 | 7/1994 | Marris | 165/1 |
| 5,367,601 | 11/1994 | Hannabery | 392/307 |

Primary Examiner—Harold Joyce
Assistant Examiner—Derek S. Boles
Attorney, Agent, or Firm—Wall, Marjama & Bilinski

[57] ABSTRACT

A method and apparatus for controlling supplemental heat added to the air stream passing from an indoor coil to an air supply duct of a heat pump system, the heat pump system being of the type that includes an indoor thermostat having a first set point for initiating heat supplied by the indoor coil and a second set point for initiating additional heat supplied by supplemental heating means. The supplemental heating elements include an adjustable output heating element for heating air passing from the indoor coil to the air supply duct. The coil discharge temperature of the air stream heated by the indoor coil is determined at a position between the indoor coil and the supplemental heating means. The adjustable output heating element is selectively energized in response to the coil discharge temperature, independent of the second set point of the indoor thermostat.

9 Claims, 3 Drawing Sheets

METHOD AND APPARATUS FOR CONTROLLING SUPPLEMENTAL HEAT IN A HEAT PUMP SYSTEM

CROSS REFERENCE TO RELATED APPLICATION

This is a divisional application of U.S. Ser. No. 09/012,542, filed Jan. 23, 1998, now allowed, the entirety of which is incorporated herein by reference.

BACKGROUND OF THE INVENTION

The present invention relates to a method and apparatus for controlling supplemental heat in a heat pump, wherein a controllable heating element is used in combination with the indoor fan coil to heat the supply air, and is controlled primarily based on the temperature of the air leaving the indoor fan coil, substantially independent of the temperature sensed at the indoor thermostat. The temperature of the air leaving the indoor fan coil can be sensed directly or predicted based on the sensed outside ambient air temperature.

Heat pump systems use a refrigerant to carry thermal energy between a relatively hotter side of a circulation loop, where compression of the refrigerant by a compressor raises the temperature of the refrigerant, to a relatively cooler side of the loop at which the refrigerant is allowed to expand, causing a temperature drop. Thermal energy is added to the refrigerant on one side of the loop and extracted from the refrigerant on the other side, due to the temperature differences between the refrigerant and the indoor and outdoor air, respectively, to make use of the outdoor air as a thermal energy source.

Heat pumps used in residential heating and cooling are bidirectional, in that suitable valve and control arrangements selectively direct the refrigerant through indoor and outdoor heat exchangers so that the indoor heat exchanger is on the hot side of the refrigerant circulation loop for heating and on the cool side for cooling. A circulation fan passes indoor air over the indoor heat exchanger and through ducts leading to the indoor space. Return ducts extract air from the indoor space and bring the air back to the indoor heat exchanger. A fan likewise passes ambient air over the outdoor heat exchanger, and releases heat into the open air, or extracts available heat therefrom.

These types of heat pump systems can operate only if there is an adequate temperature difference between the refrigerant and the air at the respective heat exchanger to maintain a transfer of thermal energy. For heating, the heat pump system is efficient provided the temperature difference between the air and the refrigerant is such that the available thermal energy is greater than the electrical energy needed to operate the compressor and the respective fans. The temperature difference generally is sufficient for efficient cooling, even on hot days. However, for heating when the outdoor air temperature is below about 25° F., the heat pump system may be unable to extract sufficient heat from the outdoor air to offset the loss of heat from the space due to convection, conduction and radiation of heat from the structure to the outdoors.

When the heat pump is unable to provide enough heat to the structure (i.e., the outdoor temperature is below the balance point between the building load and the heat pump capacity) a supplemental heating element is provided in the supply air duct downstream from the indoor heat exchanger/coil to supply the additional heat required to maintain the desired indoor air temperature. Activation of the supplemental heating is typically controlled by an indoor thermostat, by which the occupants set a desired temperature to be maintained in the space by operation of the heating system.

Conventional heat pump control systems use a two-stage-heat/one-stage-cool room thermostat. On a first call for heat from the thermostat, the heat pump compressor and fans are activated to extract heat outdoors and to release the heat indoors. The heat pump supplies air to the structure (typically at about 80° F.) until the indoor temperature reaches the thermostat set point (i.e., the first set point) and then is deactivated. If the heat loss of the structure is greater than the capacity of the heat pump, which occurs when the outdoor temperature drops, the indoor air temperature cannot be raised by the heat pump to the desired temperature. The indoor temperature thus continues to drop.

The room thermostat has a second switching means that is operated at a temperature slightly lower than the desired temperature at which the first switching means is operated. Conventionally, when the room temperature falls to the second set point defined by the thermostat, power is supplied to the supplemental heating element. The supplemental heating element supplies the additional heat needed to bring the indoor temperature up to the second set point temperature (typically the supply air is about 125° F.), and thereafter the heat pump works alone to supply heat to the structure until the first set point temperature is reached.

As explained in U.S. Pat. No. 5,367,601, however, conventional two stage heat controls cause wide swings in the temperature of the supply air emitted into the structure by the heat pump system. Such wide temperature swings (e.g., 80° F. to 125° F.) are uncomfortable for the occupants and adversely affect the efficiency of the heat pump system. In an attempt to improve occupant comfort, the '601 patent proposes a control system that provides a closer control on the operation of the supplemental heating, by sensing the supply air temperature and then continuously controlling the on/off condition of the supplemental heating. While this proposal makes strides toward maintaining the supply air temperature at a given level, it has at least two significant drawbacks.

First, the supplemental heating is used only when there has been a second call for heat from the indoor thermostat. This makes it more difficult to maintain the air supply temperature at a constant, predetermined level, as supplemental heating is never energized during first stage heating.

Secondly, the temperature sensor must be positioned in the air supply duct of the building duct work by the technician installing the heat pump. Variations in the position of the sensor can lead to variations in temperature sensing accuracy, which in turn can lead to erroneous control of the supplemental heating by the controller.

U.S. Pat. No. 4,141,408 also discloses control means for controlling supplemental heating elements in a heat pump system. This patent proposes to use sensors positioned on the indoor coil to measure the temperature of the air leaving the coil. The sensors are connected to relays that close to operate one or two fixed output heating elements. This system is unable to prevent wide swings in the air supply temperature, because there is no means for operating the supplemental heating elements during first stage heating. There is also no means for precisely controlling operation of the heating elements, in that they are simply turned on and off in response to the temperatures sensed by the sensors.

U.S. Pat. No. 5,332,028 also discloses a heat pump system having supplemental heat for application to the supply air during periods of defrost operation in order to avoid a "cold blow" condition while the heat pump is operating in the defrost mode. This patent proposes to turn on a supplemental heating element in response to the sensed temperature of the supply air during defrost and responsively turn on additional heat in stages when necessary to maintain the temperature level of the supply air at a comfortable level during defrost. This system, however, also requires the installation technician to position the air supply temperature sensor and thus suffers from the same drawback as discussed above. And there is no means by which the supplemental heating elements are controlled precisely in order to avoid the wide air supply temperature swings mentioned above. Moreover, the supplemental heating elements are not operated during first stage heating in order to insure a constant air supply temperature at all times.

SUMMARY OF THE INVENTION

It is therefore an object of the present invention to maintain the temperature of the supply air emitted from a heat pump system at a substantially constant level by providing for precise control of the supplemental heating elements, while removing the possibility of installation error with respect to the location of the temperature sensor downstream of the indoor coil.

The present invention provides a method and apparatus for maintaining a substantially constant supply air temperature in a heat pump system by providing precise control of the supplemental heat supplied to the air stream passing from an indoor coil to an air supply duct of the heat pump system. The heat pump system is of the type that includes an indoor thermostat having a first set point for initiating heat supplied by the indoor coil and a second set point for initiating additional heat supplied by supplemental heating elements. The method includes the steps of providing an adjustable output heating element downstream of the indoor fan coil for heating air passing from the indoor coil to the air supply duct. A microprocessor-based controller senses one of the outdoor air temperature and the coil discharge temperature of the air stream heated by the indoor coil at a position between the indoor coil and the adjustable output heating element, and then selectively energizes the adjustable output heating element in response to the sensed temperature, independent of the second set point of the indoor thermostat. If the adjustable output heating element alone cannot assist the indoor coil in maintaining the air supply temperature at a predetermined base temperature, then one or more fixed output heating elements can also be used.

The present invention is prefaced on the recognition by the inventors that, in order to maintain an air supply temperature at a predetermined base temperature of, say 105° F., it may sometimes become necessary to add supplemental heat to the supply air when the heat pump system is operating only in the first stage (i.e., in response to the first call from the indoor thermostat). The inventors also recognized that the use of fixed output heating elements, even if used during the first stage of heat pump activity, often times supply too much heat to the supply air, thus causing the wide temperature swing problem experienced by prior systems.

The invention overcomes this problem by using an adjustable output heating element in combination with the indoor coil during the first stage of heat pump operation. The adjustable output heating element is powered independent of the second set point of the indoor thermostat, in that there need not be a call for supplemental heat from the thermostat before the adjustable output heating element is energized. In this way, the adjustable output heating element can be powered along with the first stage heating supplied by the indoor coil in order to maintain the supply air at a substantially constant, predetermined base temperature (e.g., 105° F.). If the demand on the adjustable output heating element exceeds its output capability, then the fixed output heating elements also can be energized one at a time in order to meet the building load. And, if the load causes the thermostat to call for supplemental heat, operation of the adjustable output heating element can be disengaged if necessary so that full power can be supplied to as many supplemental heating elements (including the adjustable output heating element) as necessary to satisfy the second call from the thermostat.

The present invention also overcomes the sensor positioning problems discussed above, by using a factory-installed sensor located at the downstream side of the indoor air coil, or alternatively, using an outdoor sensor. In either case, there is no calibration error introduced into the system because there is no need for the installer to position the sensor at a precise location in the air supply duct work of the building to be heated.

These and other objects of the present invention will be better understood by reading the following detailed description in combination with the attached drawings of a preferred embodiment of the invention.

DETAILED DESCRIPTION OF THE INVENTION

Figure 1:
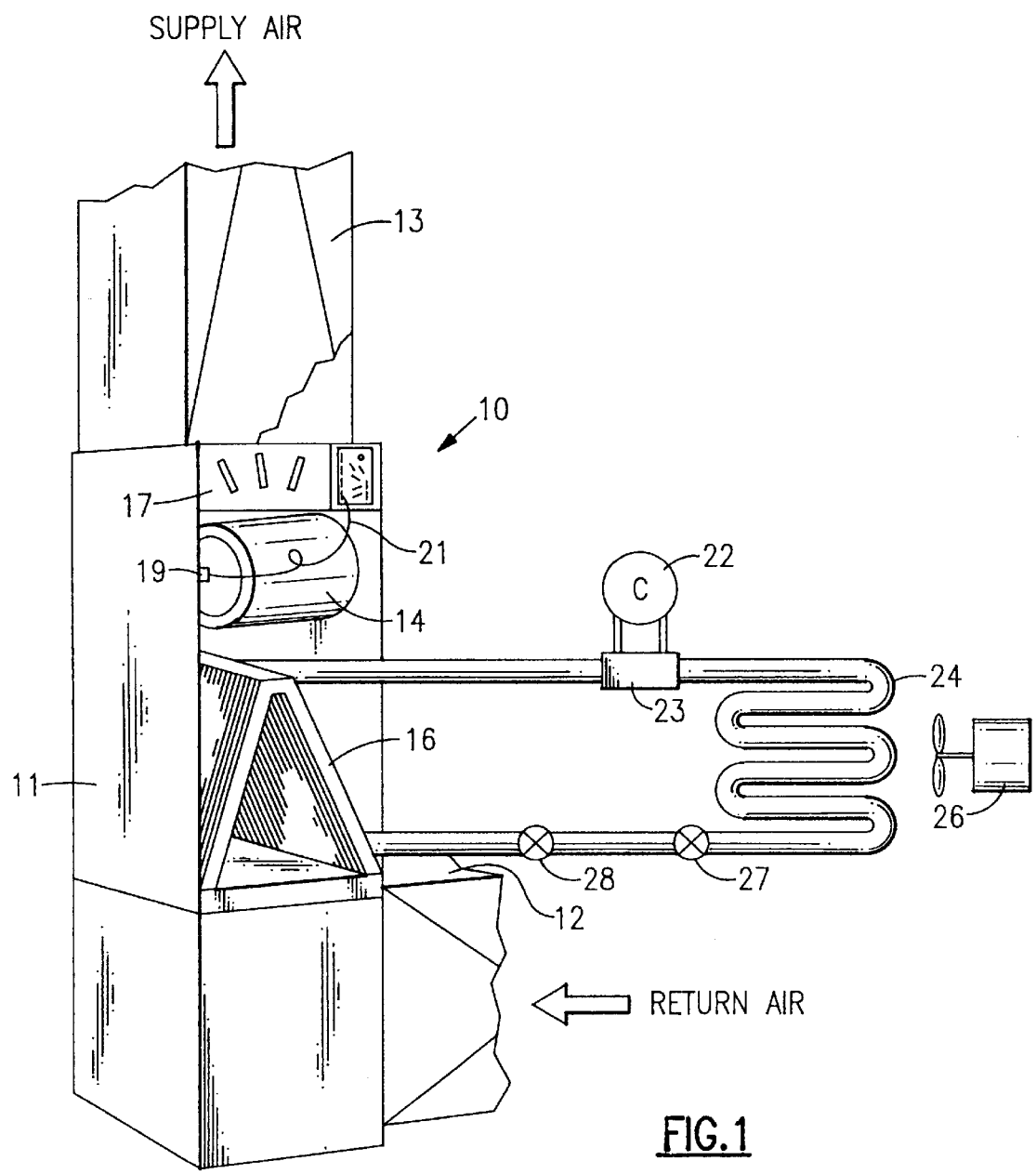
FIG. 1 is a pictorial representation of an indoor coil section of a heat pump system having the present invention incorporated therein.

Referring now to FIG. 1, the invention is shown generally at 10 as incorporated into an indoor coil section 11 having a return air plenum 12, a supply air plenum 13 and a blower motor assembly 14 for drawing the air into the return air plenum 12 and supplying it back to the space to be conditioned by way of the supply air plenum 13. An indoor coil 16 is disposed within the system and has refrigerant circulated therethrough for the purpose of cooling or heating the air passing over the coil 16 as it is circulated through the system. The indoor coil 16 acts as an evaporator in the cooling mode to remove heat from the indoor air and as a condenser in the heating mode to provide heat to the indoor air. During the defrost mode, the system switches from the heating mode to a cooling mode to allow the heat from the indoor air to be transferred by the refrigerant to the outdoor coil to facilitate the defrosting thereof.

An electric heating module 17 is provided just downstream of the blower motor assembly 14. Conventionally the electric resistance heating elements in module 17 are energized to supplement the heat pump during low (e.g., less than 32° F.) outdoor temperature conditions. This module is also used during the defrost mode to heat the air being supplied to the conditioned space while heat is removed from the return air for the purpose of defrosting the outdoor coil. In accordance with the present invention, this module is also operated during the first stage of heat pump operation (i.e., when the indoor coil is usually acting alone to provide the heated supply air). This aspect of the invention will be explained later below in more detail.

A microprocessor-based controller 18 is provided to control the entire heat pump system in response to signals received from an indoor thermostat (not shown) and a temperature sensor 19, such as a thermistor or the like. Thermistor 19 functions to sense the temperature of the air leaving the indoor coil. Thermistor 19 can also be used to sense the temperature of the outdoor air, and in both cases those temperature signals are provided to the controller 18 by way of leads 21 during operation of the heat pump.

The indoor coil 16 is connected to a standard closed loop refrigeration circuit which includes a compressor 22, a 4-way valve 23, an outdoor coil 24 with a fan 26 and expansion valves 27 and 28. The 4-way valve 23 is selectively operated by the controller 18 to function in the respective cooling, heating, or defrost modes, with either the expansion valve 28 functioning to meter the flow to the indoor coil 16 or the expansion valve 27 functioning to meter the refrigerant flow to the outdoor coil 24. The controller 18 can be applied to selectively operate the compressor 22 and the fan 26 as well.

Figure 2:
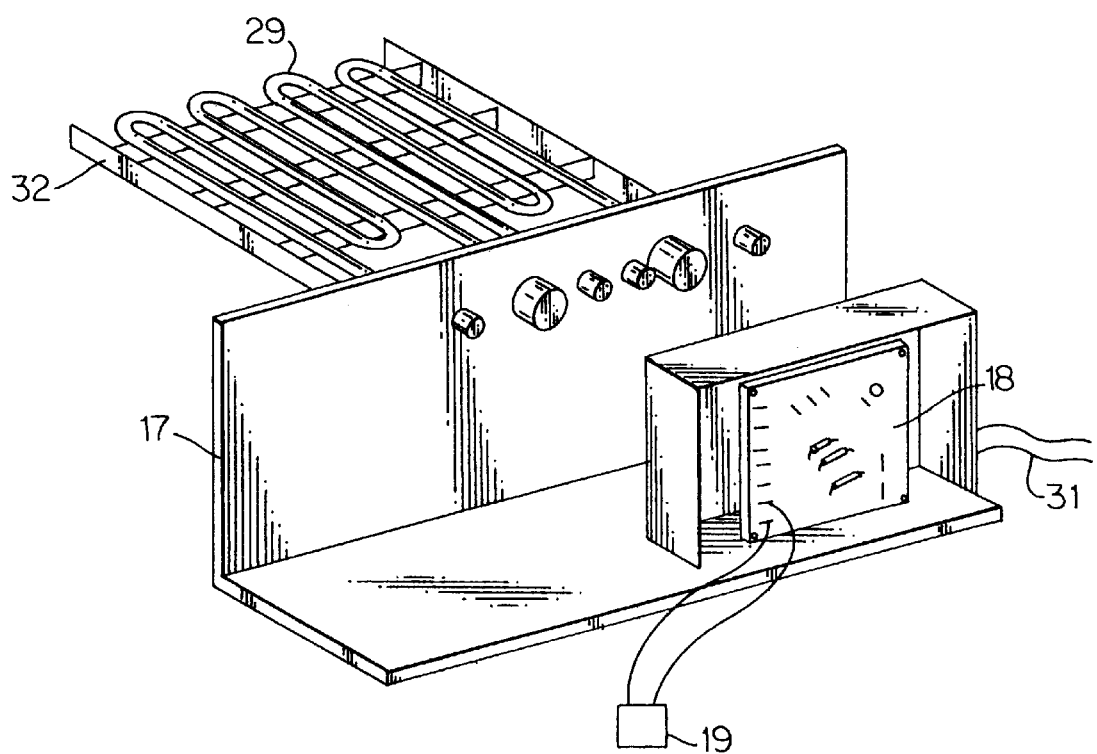
FIG. 2 is a perspective view of the electric heating module portion of a heat pump system having the present invention incorporated therein.

The electric heating module 17 is shown in greater detail in FIG. 2 to include a plurality of electric resistance heating elements 29 which are connected to a pair of power leads 31 by way of a relay (not shown) controlled by controller 18. The heating elements 29 extend rearwardly into the supply air plenum 13 and are vertically supported by a plurality of support rods 32 as shown. Each of the heating elements is preferably rated at 5 kW, although other rated elements can also be used. One of the heating elements is adjustable, in increments as low as 100 W, from 0 up to 5 kW. The remaining elements, preferably up to three additional elements, are all fixed, preferably at the same output rating level. FIG. 2 depicts only a two-element setup.

Figure 3:
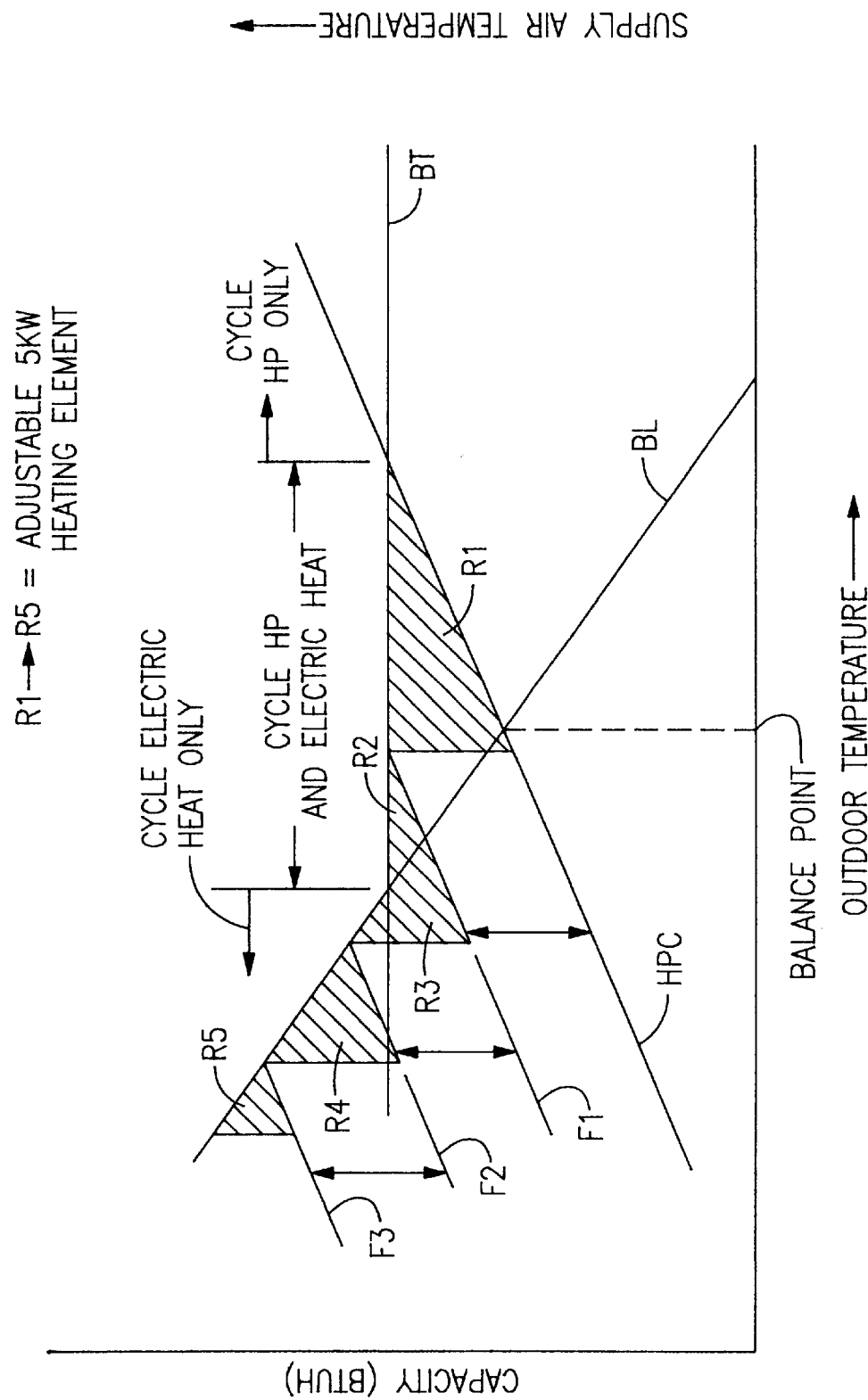
FIG. 3 is a graph showing heat pump capacity and building load requirements with respect to outdoor temperature and supply air temperature.

FIG. 3 shows a graph of outdoor temperature versus air supply temperature, and includes plot HPC showing the heat pump capacity (determined by the parameters of the heat pump system itself) and plot BL showing the building heating requirements (building load). FIG. 3 shows that heat pump capacity decreases and the building load increases, both substantially linearly, as the outdoor temperature decreases. The balance point is where the two lines cross. Conventionally, the first stage of a heat pump system is typically employed to serve the needs of the load at outdoor temperatures above the balance point, whereas second stage heating (supplemental heating) is added to the air supply of the system at outdoor temperatures below the balance point. The balance point for the system depicted graphically in FIG. 3 is about 34° F.

In order to maintain a base air supply temperature of, say 105° F. (the horizontal BT line in FIG. 3), the present invention selectively controls the power supplied to the adjustable output heating element based on the following formula:

$$kW = Constant \times CFM \times (T2-T1)$$

where T2 is the target base temperature (BT) of the supply air,
T1 is the temperature of the air leaving the indoor coil, and
CFM is the airflow through the system (which is known with some fan models and approximated with other fan models).

(The Constant simply assures reconciliation among the various units.) When T1 is sensed at the output of the indoor coil, that reading is used directly in the above formula. However, when sensing the outdoor temperature, T1 is predicted by extrapolation from the graph shown in FIG. 3. This can be done entirely within the controller 18 using well-known look up techniques.

In accordance with the invention and with reference to FIG. 3, the controller periodically calls upon sensor 19 for a temperature reading (T1). The controller then calculates the amount of kW power that must be supplied by the adjustable output heating element. If there has been a call from the indoor thermostat for first stage heat, but T1 equals T2, the system will cycle the first stage heat only, as depicted by the HP ONLY section of the graph in FIG. 3. If, however, T1 is less than T2, the controller will calculate the amount of power to be supplied to the adjustable output heating element using the above formula, and then control the power supplied to the adjustable output heating element using a solid state relay.

The preferred method of supplying power to the adjustable output heating element will now be explained by way of example. Say the calculated power requirement for the adjustable output heating element is 2 kW and the full power rating of the adjustable output heating element is 5 kW. This means that 40% of the full power of the adjustable output heating element is required to raise T1 to the base temperature, T2(BT). Power is supplied to the adjustable output heating element over a fixed number of line cycles, say 100 line cycles for example. If the calculation determines that 40% power is required for the adjustable output heating element, then power will be switched on to that element for 40 line cycles and then switched off for 60 line cycles. This produces the necessary 2 kW output from the adjustable output heating element. This cyclical application of power to the adjustable heating element is repeated continuously for as long as the controller senses (via sensor 19) that T1 is less than T2.

Preferably, the power to the adjustable output heating element is changed incrementally, say in increments as low as 2% full power, in order to allow precise control of the air supply temperature. Accordingly, if 40% power is called for the first time T1 is sensed, but T1 has decreased at the next reading cycle and the controller now calculates that 45% power (i.e., 2.25 kW) is needed to raise T1 to T2, then the power to the adjustable output heating element is increased by 5% (i.e., continuously turned on and off for 45 and 55 line cycles, respectively) until T1 equals T2. Although increments of 2% can be realized using the present invention, increments of 5% full power are probably as low as would be needed to deal with fluctuations in T1.

If the calculated power exceeds the rated output of the adjustable output heating element (e.g., 5 kW), then one of the additional fixed output heating elements (e.g., 5 kW each) will be energized by the controller and then the power to the adjustable output heating element will be changed continuously to meet the power demand in excess of 5 kW.

The adjustable output heating element preferably is switched on and off by a solid state relay while the remaining elements are switched on and off using electromechanical relays. The solid state relay is driven by a relay driver circuit incorporated in controller 18. The solid state relay has zero crossing circuitry which switches the adjustable output heating element on and off only when the line cycle crosses zero volts. Thus, the on/off delay of onehalf line cycle limits the smallest on time for the heating element to 2 line cycles. In the case of a heating element rated at 5 kW and operating on a 100 line cycle time base, the lowest power output would therefore be 100 W.

The partial lines F1, F2 and F3 in FIG. 3 that parallel the heat pump capacity line show the effect of energizing fixed 5 kW heating elements. The triangular shaded region R1 shows the added capacity as a result of powering the adjustable output heating element as described above. The triangular shaded region R2 shows the added capacity as a result of powering the adjustable output heating element while a first additional fixed 5 kW heating element is energized by the controller. These regions R1 and R2 are bounded by the BT temperature line (105° F. in FIG. 3). The intersection of the BT line with the BL and HPC lines dictates the outdoor temperature range in which the adjustable output heating element (region R1) and, if necessary, one of the additional fixed output heating elements (region R2) are energized cyclically with the first stage heating supplied by the indoor coil. To the left of the intersection of the BT line with the BL line, the heat pump capacity is so low that the system runs the indoor coil continuously and cycles the plurality of heating elements (including the adjustable output heating element as shown by shaded regions R3, R4 and R5) in order to meet the load demand of the building.

In accordance with the present invention, the air supply temperature can be maintained at a substantially constant temperature, both during first and second stage heating, by use of an adjustable output heating element in combination with additional fixed output heating elements.

Additionally, the opportunity for installer-induced error can be avoided by using a factory installed temperature sensor at the downstream side of the indoor coil or an off-the-shelf outdoor temperature sensor.

While the present invention has been described with reference to a particular preferred embodiment, it will be understood by those skilled in the art that various modifications and the like could be made thereto without departing from the spirit and scope of the invention as defined in the following claims.

What is claimed is:

1. A heat pump system, comprising:
   outdoor and indoor heat exchange coils with associated fans;
   a compressor;
   an expansion device;
   means for reversing the flow of refrigerant for purposes of selecting between heating, cooling, and defrost modes of operation;
   supplemental heating means for heating an air stream passing from the indoor coil to an air supply duct, said supplemental heating means comprising an adjustable output heating element;
   an indoor thermostat having a first set point for initiating heat supplied by the indoor coil and a second set point for initiating additional heat supplied by the supplemental heating means;
   means for determining the coil discharge temperature of the air stream heated by the indoor coil at a position between the indoor coil and the supplemental heating means; and
   control means for selectively energizing the adjustable output heating element in response to the coil discharge temperature, independent of the second set point of the indoor thermostat.

2. The heat pump system of claim 1, wherein said means for determining the coil discharge temperature comprises temperature sensing means positioned between the indoor coil and the adjustable output heating element.

3. The heat pump system of claim 1, wherein said means for determining the coil discharge temperature comprises outdoor temperature sensing means and the coil discharge temperature is predicted based on a reading from outdoor temperature sensing means.

4. The heat pump system of claim 1, wherein said adjustable output heating element is energized when the coil discharge temperature decreases below a predetermined base temperature for the supply air.

5. The heat pump system of claim 4, further comprising means for calculating the amount of power to be supplied to said adjustable output heating element based on the coil discharge temperature, and said control means selectively energizes said adjustable output heating element to raise the air supply temperature to the base temperature.

6. The heat pump system of claim 5, wherein said adjustable output heating element has a maximum output, said calculating means calculates the amount of power to be supplied to said adjustable output heating element as a first percentage of the maximum amount, and said control means supplies power cyclically to said adjustable output heating element for a time-based percentage equal in magnitude to the first percentage.

7. The heat pump system of claim 5, wherein said adjustable output heating element has a maximum output, and said control means incrementally changes the amount of power supplied to said adjustable output heating element based on the amount of power calculated by said calculating means.

8. The heat pump system of claim 5, wherein said supplemental heating means further comprises at least one fixed output heating element and said control means energizes said fixed output heating element in addition to said adjustable output heating element when the amount of power calculated by said calculating means exceeds a predetermined level.

9. The heat pump system of claim 2, wherein said temperature sensing means is a thermistor located adjacent said fan associated with said indoor coil.

* * * * *